United States Patent [19]
Logan

[11] Patent Number: 6,090,321
[45] Date of Patent: Jul. 18, 2000

[54] PROCESS FOR CONTROLLING THE MICROSTRUCTURAL BIAS OF MULTI-PHASE COMPOSITES

[75] Inventor: Kathryn V. Logan, Roswell, Ga.

[73] Assignee: Georgia Tech Research Corporation, Atlanta, Ga.

[21] Appl. No.: 09/071,150

[22] Filed: Apr. 23, 1998

Related U.S. Application Data

[60] Provisional application No. 60/044,156, Apr. 23, 1997.

[51] Int. Cl.[7] ................................................. C04B 33/32
[52] U.S. Cl. ........................... 264/122; 264/642; 264/649
[58] Field of Search .................................. 264/40.1, 642, 264/649, 122

[56] References Cited

U.S. PATENT DOCUMENTS

| | | | |
|---|---|---|---|
| 5,637,266 | 6/1997 | Lai et al. | 264/122 |
| 5,660,599 | 8/1997 | Schlott et al. | 264/122 |
| 5,700,418 | 12/1997 | Hormann et al. | 264/122 |
| 5,792,403 | 8/1998 | Massa et al. | 264/122 |

OTHER PUBLICATIONS

Keckes, L.J. et al., Dynamic Consolidation of Combustion–Synethsized Alumina–Titanium Diboride Composite Ceramics, J. Am. Ceram. Soc., 79[10]2687–95 (1996).

Logan, K.V., Elastic–Plastic Behavior of Composite $TiB_2$/$Al_2O_3$ Produced Using Self–Propagating High Temperature Synthesis, PhD dissertation, Georgia Institute of Technology, Sep. 1992 Figures Only (1–26).

*Primary Examiner*—Christopher A. Fiorilla
*Attorney, Agent, or Firm*—Deveau & Marquis

[57] ABSTRACT

A process for controlling and thus predicting the microstructural bias of multi-phase composites to obtain preferential positioning of the component compounds in their morphology and position in the resulting microstructure to cause the grains of a first phase either to locate at the grain boundaries of a second phase, or to be homogeneously distributed in the second phase using both conventional manually mixing (MM) and advanced self-propagating high-temperature (SHS) processing technologies. A process whereby a lower cost composite material performs comparably to a more expensive monolithic nature of higher performance material by causing the higher performance first phase grains to preferentially locate at the grain boundaries of the second phase during densification/fusing. A process to optimize the performance properties by preferentially biasing the microstructure to cause the phase which intrinsically has the preferred properties to influence and enhance the desired properties of the bulk composite material.

6 Claims, 17 Drawing Sheets

DOCUMENTED PROPERTIES OF SELECTED MATERIALS

| Compound | MOR (MPa) | $K_{1c}$ (MPa·m$^{1/2}$) | Compr.Str. (GPa) | Y. Mod. (GPa) | Poiss. Ratio |
|---|---|---|---|---|---|
| $Al_2O_3$ | 380-440 | 3.5-4.0 | 3.41-3.80 | 280-390 | 0.23 |
| $TiB_2$ (C) | 400 | 6.69-8.00 | 5.33-5.87 | 347-570 | 0.11-0.13 |
| $TiB_2/Al_2O_3$(MM) | 310 | 3.60 | --- | 415 | --- |
| $SiC/Al_2O_3$ | 451 | 7.3 | 5.62-6.74 | 392 | 0.22 |
| SiC (HP) | 690-730 | 3.01-5.23 | 5.2-6.79 | 315-445 | 0.16-0.17 |
| SiC (S) | 312 | 3.0 | 3.87-5.24 | 408 | 0/16 |
| $B_4C$ | 400-690 | 3.70-4.50 | 3.73-5.43 | 440-457 | 0.17-0.19 |
| 4340 Steel | 792 | 48 (ksi·in$^{1/2}$) | --- | 200 | 0.29 |

(C): Carbothermic  (S): Sintered  MOR: Modulus of Rupture
(MM): Manually-Mixed  (HP): Hot Pressed  $K_{1c}$: Fracture Toughness

*FIG 1*

Summary of Microstructural Observations

| Sample | 225 | 227 |
|---|---|---|
| Fracture Mode | Predominantly trans-granular | Predominantly inter-granular |
| $Al_2O_2$ grain size | 20-40 microns | 10-20 microns |
| $TiB^2$ grain size | 1-10 microns | 1-5 microns |
| Phase distribution | $TiB_2$ at the $Al_2O_3$ grain boundaries | Homogeneous distribution |
| Theoretical density | (%) 95.7 | 95.8 |

*FIG 4*

SPLIT HOPKINSON BAR TEST RESULTS

+ = SAMPLE # 758   △ = SAMPLE # 762   ● = SAMPLE # 766
--- = PURE ALUMINA           —— = COMPOSITE

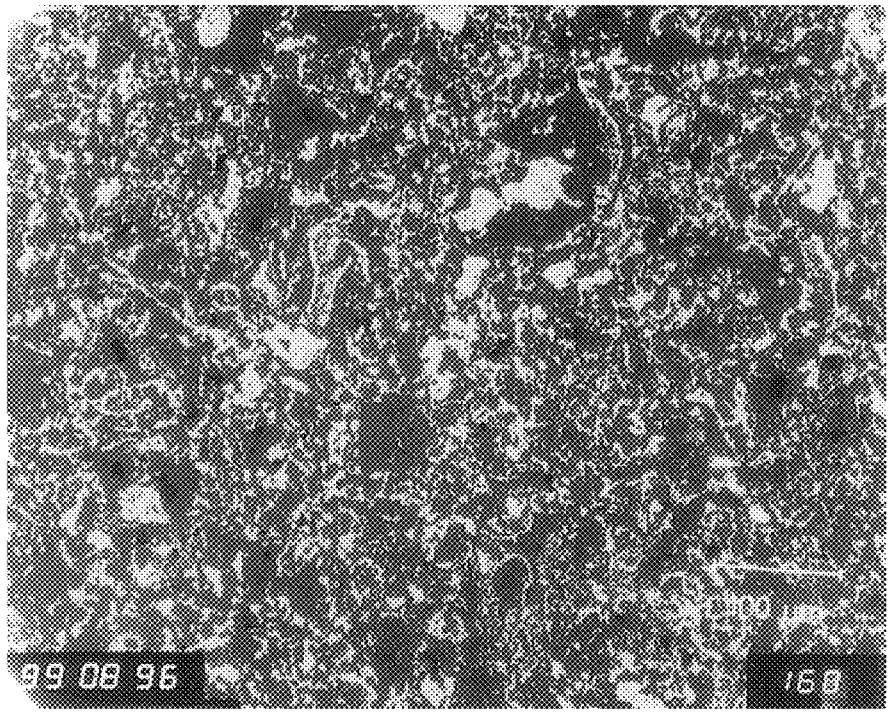
FIG. 14  SHS T@A
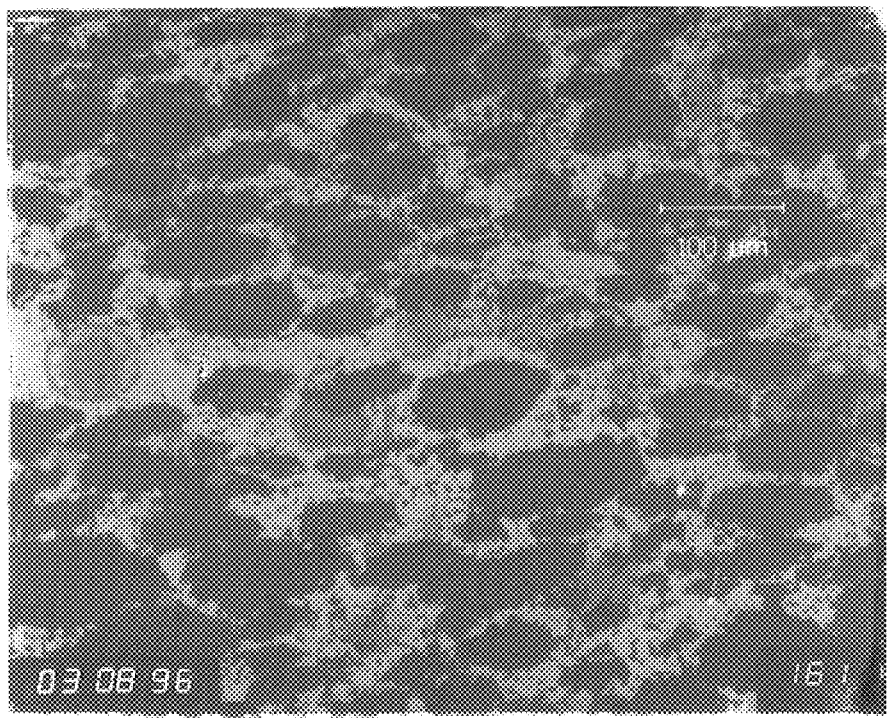
FIG. 15  MM T@A

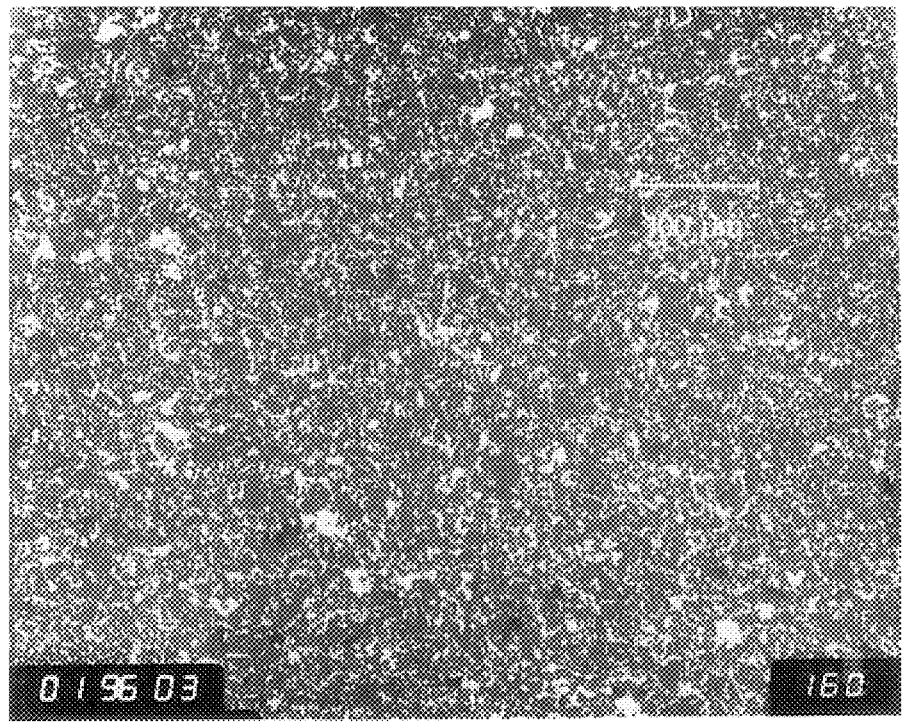
FIG. 16  SHS T IN A
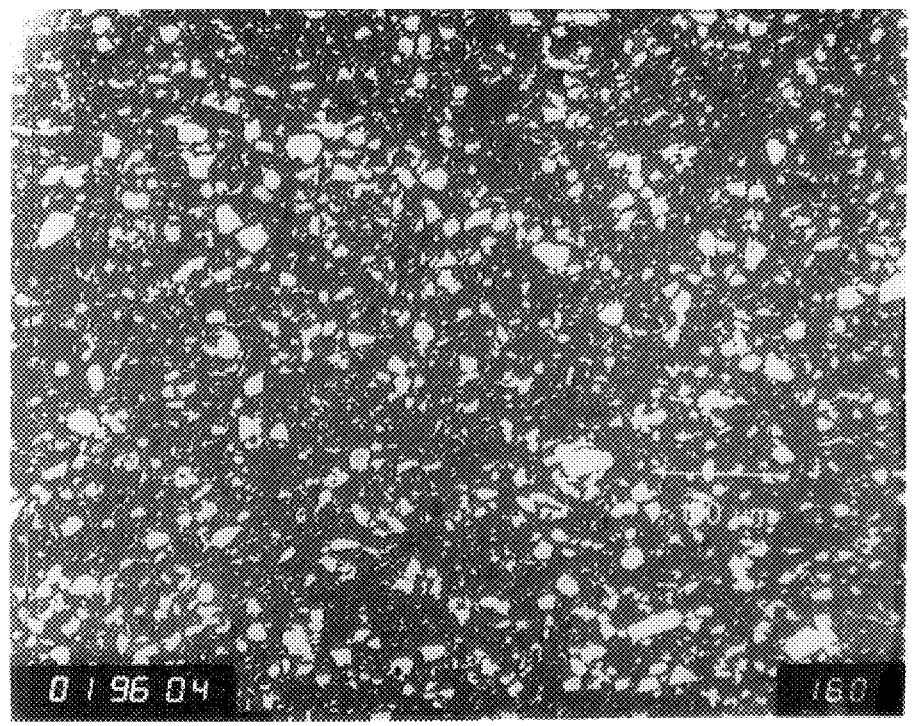
FIG. 17  MM T IN A

HOT PRESS MATRIX

| HOLD TIME | 500psi | 3375psi | 5000psi | 500/5000psi |
|---|---|---|---|---|
| 30 min | MM | MM | MM | MM |
| 30 min | SHS | SHS | SHS | SHS |
| 90 min | - | MM | MM | - |
| 90 min | - | SHS | SHS | - |
| 150 min | MM | MM | MM | MM |
| 150 min | SHS | SHS | SHS | SHS |
| 240 min | MM | - | MM | MM |
| 240 min | SHS | - | SHS | SHS |

*FIG 22*

MECHANICAL PROPERTY SUMMARY

|  | SHS | | MM | |
|---|---|---|---|---|
|  | T@A | TinA | T@A | TinA |
| MOR | 394 | 471 | 298 | 294 |
| EMOD | 411 | 410 | 420 | 423 |
| KIc | 4.05 | 4.4 | 3.45 | 3.9 |

FIG 26

PROCESS FOR CONTROLLING THE MICROSTRUCTURAL BIAS OF MULTI-PHASE COMPOSITES

This application claims benefit on provisional application 60/044,156 filed Apr. 23, 1997.

BACKGROUND OF THE INVENTION

1. Field of the Invention

This invention relates generally to a process for controlling, and thus predicting, the microstructural bias of multi-phase composites. This invention relates specifically to a process for obtaining preferential positioning of the component phases present in the microstructure of multi-phase particulate composite materials. The invention has utility in the production and optimization of the properties of high performance materials.

2. Prior Art

At present, when manufacturing multi-phase composites, the multi-phase composite microstructure usually cannot be predicted, and thus cannot be controlled, on a micron scale level. This is a major cause of low reliability and high manufacturing reject rate of the final composite product. Also, since most high performance materials are opaque, quality control of the microstructure during or after manufacture by non-destructive evaluation or testing (NDE) is not possible. Quality control is critical, often meaning the difference between life and death for persons relying on the material used in armor.

In the Rule of Mixtures for composites, the bulk properties of a composite usually are governed by the continuous phase which is not necessarily present in the greatest volume or weight. Typically, high performance monolithic ceramics are expensive to process because of the extreme processing conditions required due to their intrinsic properties such as high melting points and hardness. As a result, many high performance monolithic materials are expensive to manufacture.

To the best of the inventor's knowledge, no one has been able to define the criteria for an armor material to resist penetration. To date, there has been no specific correlation made between hardness, elastic modulus, toughness, strength and a material's resistance to penetration. Now, by learning to control the microstructural bias of a multi-phase composite, a direct correlation has been made between the microstructural bias and resistance to penetration.

BRIEF SUMMARY OF THE INVENTION

A process to control and thus predict the microstructural bias of multi-phase composites to obtain preferential positioning of the component compounds in their morphology and position in the resulting microstructure. In general, the process will cause one component phase either to locate at the grain boundaries of the second component phase (1@2) or to be homogeneously distributed in the second component phase (1in2). In a titanium diboride and alumina mixture, the process can be used to cause titanium diboride grains either to locate at the alumina grain boundaries (T@A), or to be homogeneously distributed in the alumina (TinA), using both conventional manually mixed (MM) and advanced self-propagating high-temperature synthesis (SHS) processing technologies.

A process whereby the lower cost composite material, such as titanium diboride/alumina, performs comparably to the more expensive monolithic material, such as pure titanium diboride, by causing the grains of one phase to preferentially locate at the grain boundaries of, or to be homogeneously distributed within, the other phase during densification/fusing.

A process to optimize the performance properties of multi-phase composites by preferentially biasing the microstructure to cause the phase which intrinsically has the preferred properties to influence and enhance the desired properties of the bulk composite material.

BRIEF SUMMARY OF THE FIGURES

FIG. 1 is a chart of properties documented in the literature of selected ceramic materials.

FIG. 4 shows a summary of the microstructural observations comparing of SHS T@A (sample 225) and SHS TinA (sample 227).

FIG. 14 is a representative micrograph view of SHS T@A composite $TiB_2/Al_2O_3$ ball milled 24 hours and hot pressed at 5000 psi continuous pressure.

FIG. 15 is a representative micrograph view of MM T@A composite $TiB_2/Al_2O_3$ ball milled 24 hours and hot pressed at 5000 psi continuous pressure.

FIG. 16 is a representative micrograph view of SHS TinA composite $TiB_2/Al_2O_3$ ball milled 24 hours and hot pressed at 500 psi until optimal temperature is reached, then immediate application of 5000 psi pressure.

FIG. 17 is a representative micrograph view of MM TinA composite $TiB_2/Al_2O_3$ ball milled 24 hours and hot pressed at 500 psi until optimal temperature is reached, then immediate application of 5000 psi pressure.

FIG. 22 shows a matrix of pressures and hold times used in hot pressing the inventive composites.

FIG. 26 is a summary of averaged mechanical property values of SHS and MM T@A and TinA samples.

DETAILED DESCRIPTION OF A PREFERRED EMBODIMENT

Monolithic ceramic materials such as TiB$_2$, SiC, B$_4$C and Al$_2$O$_3$ exhibit excellent high performance properties. However, synthesis and processing of these ceramics require high temperatures, high pressures and expensive finishing steps. Further, the resultant products have a high reject rate and low reliability, which cause a high manufacturing cost. The present invention discloses a method for combining certain high performance materials with other materials, resulting in multi-phase composites, which have performance characteristics similar to, or better than, the monolithic high performance ceramics, yet are less expensive to manufacture, can be manufactured using lower temperatures and/or pressures, have less expensive finishing steps, have lower reject rates, and have higher reliability. FIG. 1 is a chart of properties of selected known ceramic materials documented in the literature.

Many multi-phase composites are formed by hot pressing. The present process shows that the rate of application of pressure in hot pressing can cause different grain morphologies to occur in the resulting dense microstructures. This general result has been published by the inventor, but not with the "key" perspective described herein and not specifically noting a preferred orientation. Kecskes, L. J. et al., Dynamic Consolidation of Combustion-Synthesized Alumina-Titanium Diboride Composite Ceramics, 79 J. Am. Ceram. Soc. 10., p. 2687–95 (1996). The present process also shows that effect of microstructure on dynamic behavior of armor material. This general result also has been published by the inventor, but not with the "key" perspective described herein and not specifically noting a preferred orientation.

Logan, K. V., Elastic-Plastic Behavior of Composite TiB$_2$/ Al$_2$O$_3$ Produced Using Self-Propagating High Temperature Synthesis, Ph.D. Dissertation, Georgia Institute of Technology (September 1992 ) ("Logan Dissertation"). This preferred orientation previously had been suspected by the inventor, but until now not demonstrated.

By controlling the starting component composition and particle size of, the rate of application of applied pressure to, and the hold time at various temperatures during densification of, a mixture comprising commercially available components (powders), or of components (powders) synthesized using advanced synthesis techniques, the microstructure (morphology and position) of one phase of a multi-phase material relative to another phase of the multi-phase material may be preferentially influenced. By influencing one phase relative to another phase in the multi-phase material, the location of the one phase relative to another can be either homogeneously distributed within, or preferentially located at, the grain boundaries of the other phase.

Figure 2:
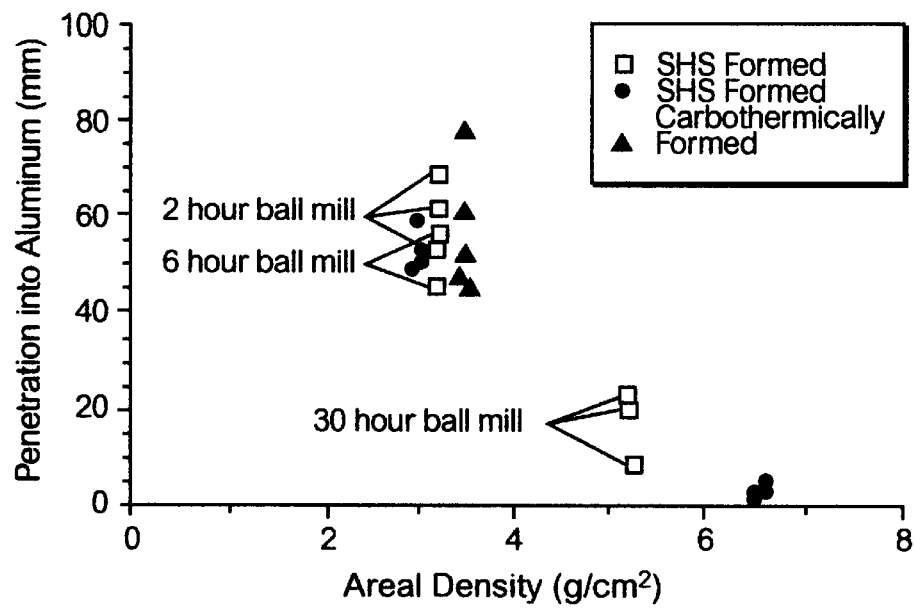
FIG. 2 shows comparative SLAP penetration test results for pure $TiB_2$ and composite $TiB_2/Al_2O_3$ ball milled 8 and 30 hours.

As a result, using the method disclosed in this specification, various multi-phase composite materials can be manufactured with predictable characteristics. One preferred predictable characteristic is a material's resistance to high strain rate penetration. FIG. 2 shows Sabot Launched Armor Projectile (SLAP) penetration test results for certain ceramic materials, specifically 2, 6 and 30-hour ball-milled self-propagating high-temperature synthesis (SHS) formed composite TiB$_2$/Al$_2$O$_3$ materials made according to the present invention, SHS formed pure TiB$_2$, and known carbothermically formed TiB$_2$ materials, indicating that the composite materials manufactured according to the present invention compare favorably to SHS formed pure TiB$_2$ and carbothermically formed TiB$_2$.

Figure 3:
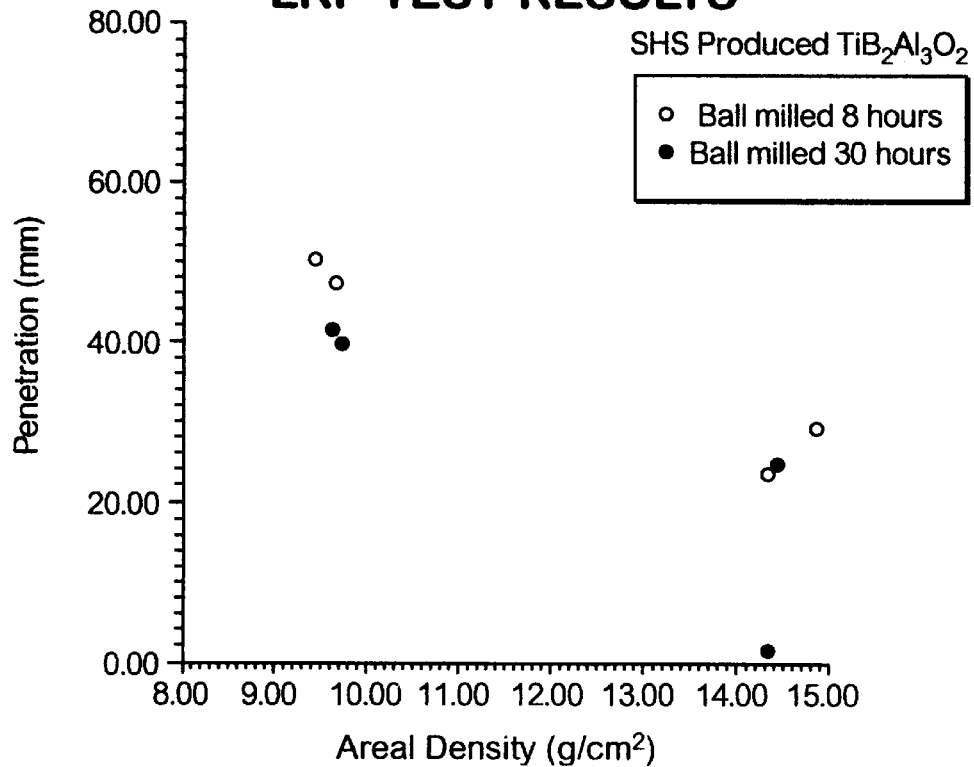
FIG. 3 shows comparative 1/d=10/1 LRP penetration test results for SHS shapes manufactured using SHS powders ball milled 8 and 30 hours then hot pressed at 5000 psi continuous (A) hold and 500/5000 psi pressure (B).

FIG. 3 shows Long Rod Penetrator (LRP) penetration test results for 8-hour and 30-hour ball milled SHS formed titanium diboride/alumina materials. The data point shown on the lower right portion of FIG. 3 (at approximately 1 mm penetration in approximately 14.5 g/cm$^2$ areal density) indicates the favorable resistance to penetration (sample 225) as compared with another sample of the same composition (sample 227). FIG. 4 shows a summary of the microstructural observations comparing T@A (sample 225) with TinA (sample 227). The results of these prior tests form the basis to seek control of the microstructural bias of the component phases. See Logan Dissertation Conclusions and Recommendations, pp. 167 and 172–174, incorporated herein by this reference. For example, observations indicated a possible correlation between microstructure and ballistic performance. Additionally, the hot pressing schedule should be varied and studied in order to produce predictability and controllable microstructures and phase distributions of the TiB$_2$ and Al$_2$O$_3$. Further, observations have indicated a possible correlation between microstructure and ballistic performance. The present specification discloses the results of such further testing and experimentation.

Figure 5:
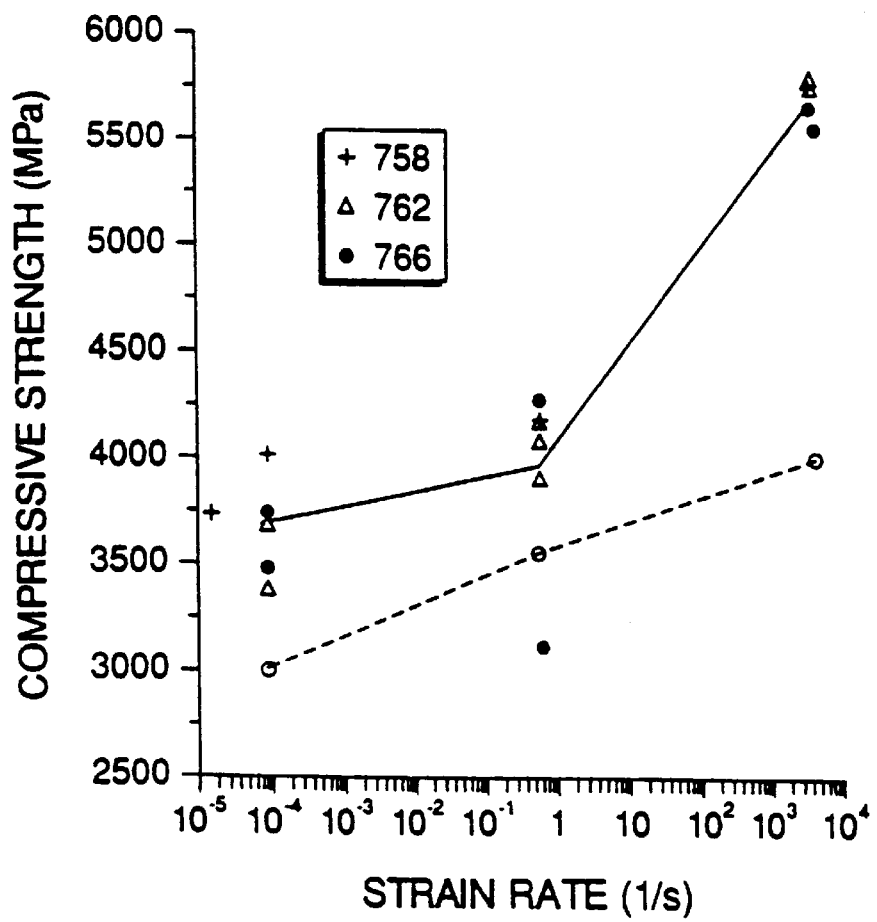
FIG. 5 shows a comparison of the strain rate versus the compressive strength of a pure alumina ceramic with an SHS produced composite $TiB_2/Al_2O_3$ which was ball milled 8 hours, then hot pressed at 5000 psi continuous pressure.

FIG. 5 shows a comparison of the strain rate versus the compressive strength of a pure alumina ceramic material with a composite TiB$_2$/Al$_2$O$_3$ material. As can be seen, the composite material has characteristics which compare favorably to the high performance pure TiB$_2$ ceramics. Yet, the composite material is less expensive to manufacture, has a higher reliability, has lower reject rates, and is easier to form at lower pressures and temperatures than the high performance ceramics.

The present invention, in a preferred embodiment comprising influencing the titanium diboride phase relative to the alumina phase in a multi-phase titanium diboride and alumina matrix material, has several basic goals.

One goal is a process to control and thus predict the microstructural bias of multi-phase composites to obtain preferential positioning of the component compounds in their orientation and position in the resulting microstructure. Correct application of the process causes titanium diboride grains either to locate at the alumina grain boundaries (T@A) or to be homogeneously distributed in the alumina (TinA) in a ceramic-ceramic composite using either powders that are manually mixed (MM), or powders that are formed using advanced processing SHS technologies.

Another goal is a process to produce a composite multi-phase material whereby the lower cost composite performs comparably to the more expensive pure material. In the case of armor material, such a composite can be manufactured by causing the titanium diboride grains to preferentially locate at the grain boundaries of the alumina during densification and fusing. In a preferred embodiment, a titanium diboride/alumina multi-phase composite is manufactured. The examples disclosed herein have a $TiB_2:Al_2O_3$ ratio of approximately 30:70; however, any ratio can be suitable allowing one or more phases to be continuous. This invention will allow a reduction in effort to manufacture, as well as opportunities to enhance composite performance properties, by the addition of a lower cost and less effort material(s) to the higher cost/more effort material(s).

To determine how the processing conditions influence the microstructure of multi-phase composites, the following manufacturing methods were tested during densification of a mixture of titanium diboride and alumina into a composite material. A nominal 30:70 example ratio of titanium diboride: alumina mixture was used for testing. These methods are explained in more detail below.
1. No pressure applied to the materials, the materials were not placed in a hot press: the titanium diboride grains either were distributed in the alumina or were located at the alumina grain boundaries.
2. Continuous application of pressure to the materials in a hot press: titanium diboride grains tend to migrate to the grain boundary of the alumina
3. SHS produced powders ball-milled 8 hours (coarser particles) and 30 hours (finer particles): ball milling the powders to various particle sizes allows one to vary the distribution of titanium diboride in alumina (grain size decreases with an increase in ball-milling time and relative distribution increases with ball-milling time).
4. Manual application of pressure to the materials with a hydraulic press (e.g., 1800 and 3000 psi) in a hot press just after the SHS reaction has occurred: titanium diboride formed into a very high aspect microstructure (1/d=100/1) in the alumina at the lower rate of application pressure, then decreased in aspect ratio (1/d=10/1 or 1/1) as the rate of application of pressure and the pressure increased.
5. Explosive compaction of the materials in a hot press: the titanium diboride tended to be dispersed in the alumina in a low aspect ratio morphology (1/d=1/1).

Another goal is a process to optimize the performance properties of multi-phase composites by preferentially biasing the microstructure to cause the phase which intrinsically has the preferred properties to influence and enhance the desired properties of the bulk composite material, by controlling raw material composition/particle size and densification/fusing parameters. The primary method for this third goal is to use fine particles (less than 12 $\mu$m) and less fine particles (less than 45 $\mu$m), and to optimize the pressure and rate of application of pressure in the densification/fusing process. For example, shapes manufactured according to the present invention from particles ball-milled for 8 hours (less fine particles) show a larger grain size than shapes manufactured according to the present invention from particles ball-milled for 24 or 30 hours (fine particles). Particles used to manufacture MM T@A composites are not ball-milled additionally than as supplied, while particles used to manufacture MM TinA composites are ball-milled.

Based on the results of the methods described in this specification, it was determined that the microstructure of multi-phase composites, specifically multi-phase ceramic-ceramic composites, can be influenced by the process conditions. Surprisingly, it was determined that by influencing the processing conditions, and thus the microstructure, multi-phase composites having performance characteristics relatively similar to known high performance monolithic materials (ceramics) can be manufactured more economically and with higher reliability. For example, the following two sets of process steps show how the microstructure of a multi-phase composite can be influenced by selecting certain process steps:

1. To cause titanium diboride to be uniformly dispersed in the alumina (TinA), the following process steps are carried out:
   a. ball mill the titanium diboride and alumina to an average particle size of less than approximately 12 microns in the SHS and in the MM;
   b. hot press the material mixture at approximately 500 psi in a reducing environment using an inert gas, typically argon, to prevent oxidation and maintain the reducing environment to the optimal Climbing Temperature Program (CTP) temperature (typically approximately 1620° C. determined by CTP for the examples disclosed in this specification, but is not specific); and
   c. rapidly (within 5 seconds) increasing the pressure to approximately 5000 psi when the optimal CTP temperature is reached.

2. To cause titanium diboride to surround the alumina grain boundaries (T@A), the following process steps are carried out:
   a. ball mill the titanium diboride and alumina to an average particle size less than approximately 40 microns in the SHS, and do not further ball mill in the MM; and
   b. hot press the material mixture at approximately a constant 5000 psi in a reducing environment using an inert gas, typically argon, to prevent oxidation and maintain the reducing environment to the optimal CTP.

The ball-milling times, pressures, temperatures and hold times at temperature used throughout this specification are approximate and the methods are not limited to the specific time or value. For example, the preferred pressure is dependent on the rate of application of the pressure, and not necessarily the actual magnitude of the pressure. It has been found that as the rate of applied pressure increases, the aspect ratio of the product decreases. Therefore, it has been found that the rate of applied pressure is more significant and important than the actual magnitude of the pressure. One skilled in the art would have the knowledge to select the appropriate parameters without undue experimentation.

Using the titanium diboride in alumina matrix example, the titanium diboride and alumina may be manually mixed, or reacted using a self-propagating high temperature synthesis according to the following formula:

$$3TiO_2 + 3B_2O_3 + 10Al = 3TiB_2 + 5Al_2O_3 \qquad (1)$$

Using this stoichiometry and the five manufacturing methods and relevant process steps disclosed above, the following microstructures were obtained.

1. If the materials are mixed according to equation (1), then allowed to react in situ in a graphite hot press die forming composite $TiB_2/Al_2O_3$ under the following applied range of pressures:

A. No Pressure

Figure 6:
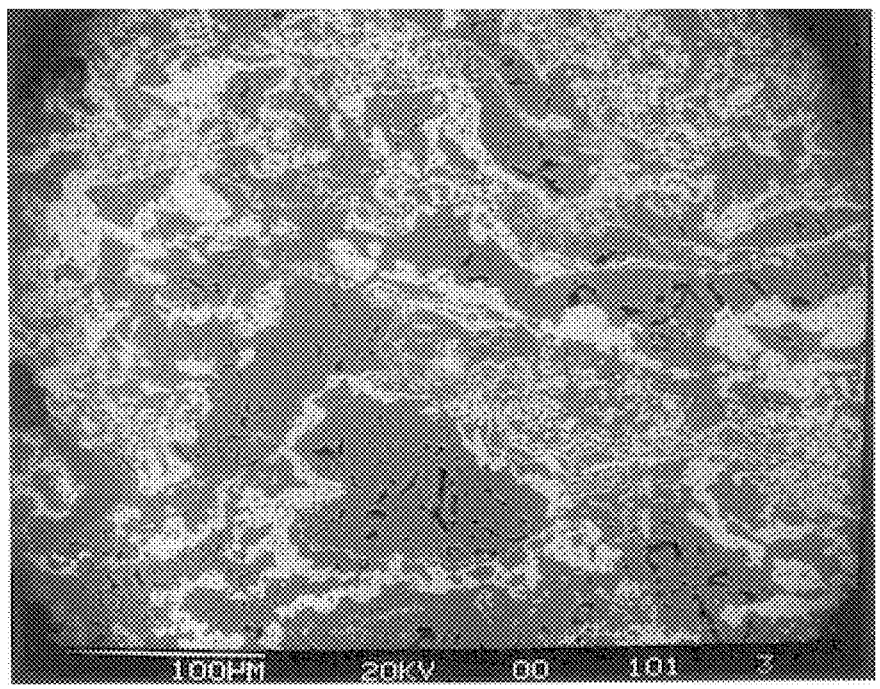
FIG. 6 is a low magnification micrograph view of SHS composite $TiB_2/Al_2O_3$ produced in-situ at ambient (one atmosphere) pressure.
Figure 10:
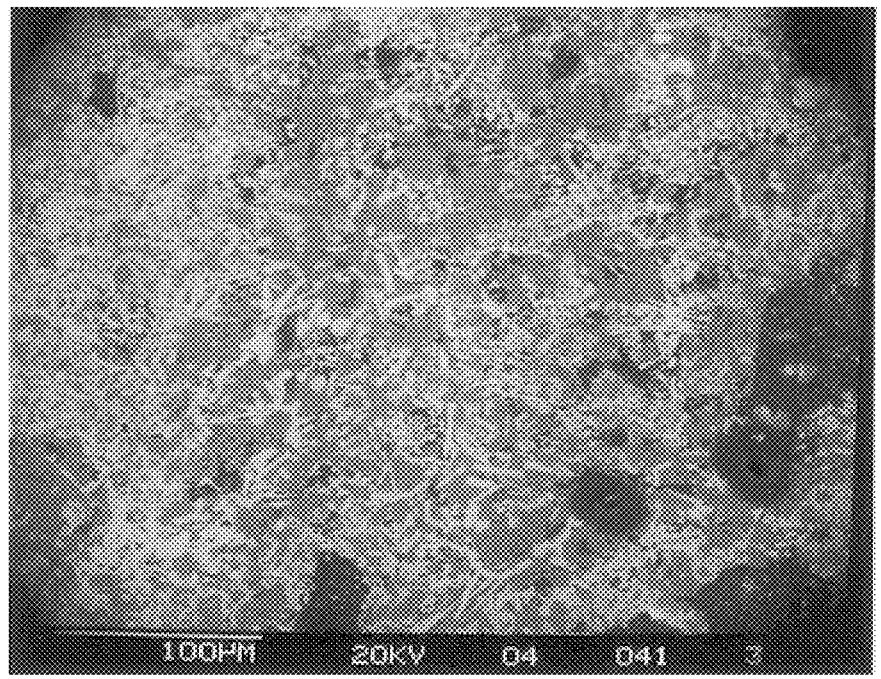
FIG. 10 is a high magnification micrograph view of SHS composite $TiB_2/Al_2O_3$ produced in-situ at ambient (one atmosphere) pressure.

The TiB$_2$ grains generally form into various aspect ratio morphologies either randomly distributed in an Al$_2$O$_3$ matrix (FIGS. 6 and 10) or surrounding Al$_2$O$_3$ grains, and the TiB$_2$ generally forms into clusters of grains having a platelet morphology distributed in an Al$_2$O$_3$ matrix. The clusters are swirled in the alumina (FIG. 6).

B. 1800 psi

Figure 7:
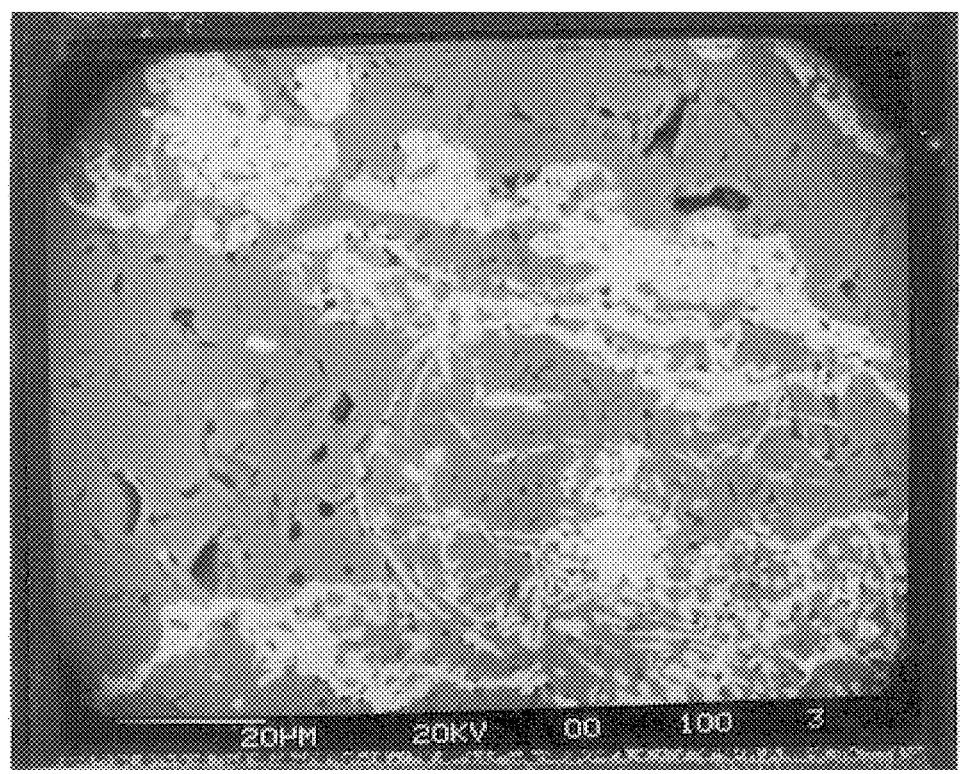
FIG. 7 is a low magnification micrograph view of SHS composite $TiB_2/Al_2O_3$ produced by applying 1800 psi pressure just after the SHS reaction has occurred.
Figure 11:
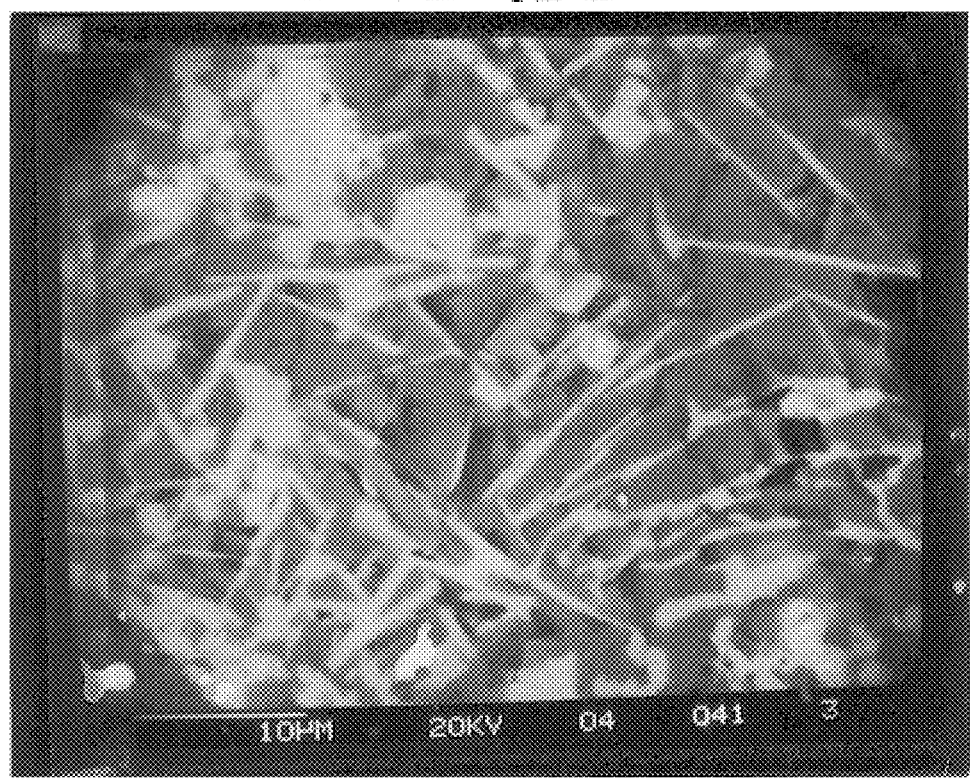
FIG. 11 is a high magnification micrograph view of SHS composite $TiB_2/Al_2O_3$ produced by applying 1800 psi pressure just after the SHS reaction has occurred.

If 1800 psi is applied immediately (within 5 seconds) following the self-propagating reaction which forms composite TiB$_2$/Al$_2$O$_3$, while the product is still red hot and plastic, the TiB$_2$ grains generally form into a high aspect ratio (needle-like, 1/d=~10/1) morphology which are randomly distributed in the alumina matrix (FIGS. 7 and 11).

C. 3000 psi

Figure 8:
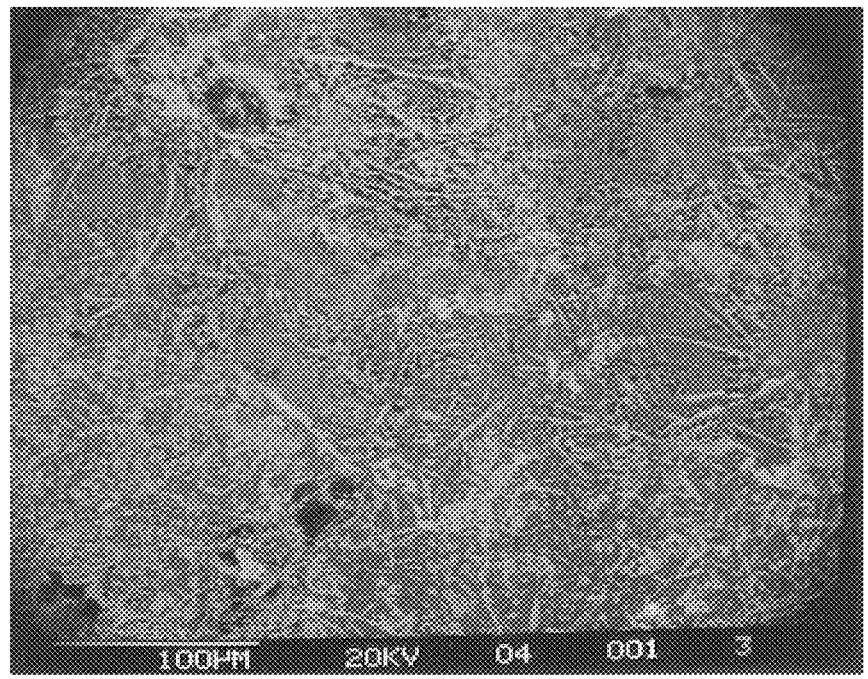
FIG. 8 is a low magnification micrograph view of SHS composite $TiB_2/Al_2O_3$ produced by applying 3000 psi pressure just after the SHS reaction has occurred.
Figure 12:
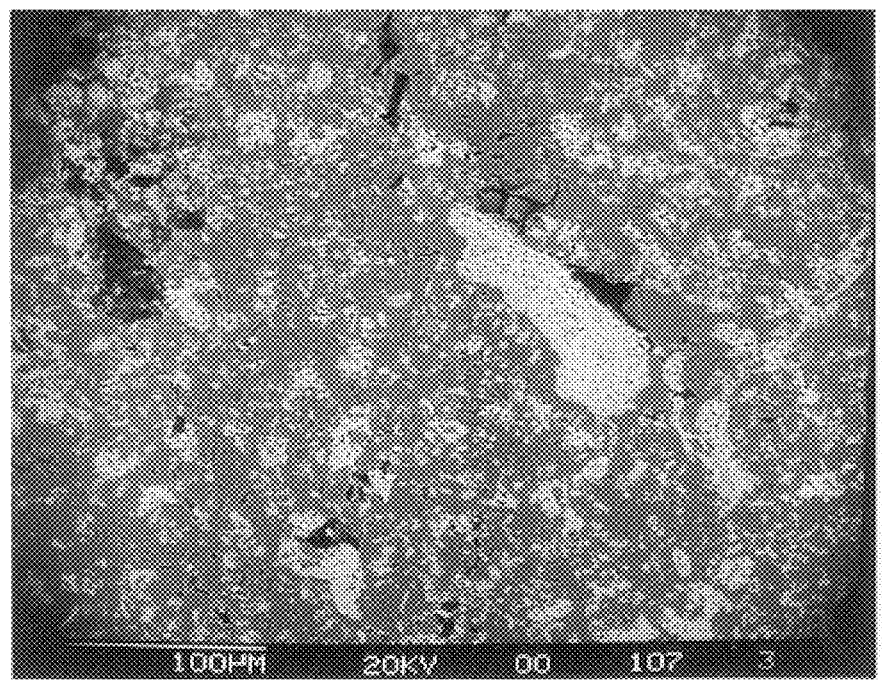
FIG. 12 is a high magnification micrograph view of SHS composite $TiB_2/Al_2O_3$ produced by applying 3000 psi pressure just after the SHS reaction has occurred.

If 3000 psi is applied immediately (within 5 seconds) following the self-propagating reaction which forms composite TiB$_2$/Al$_2$O$_3$, while the product is still red hot and plastic, the TiB$_2$ grains generally form into a high aspect ratio (needle-like, 1/d=~10/1) morphology which are randomly distributed in the alumina matrix (FIGS. 8 and 12).

2. If the materials are mixed according to equation (1), then allowed to react in situ in the sample holder forming composite TiB$_2$/Al$_2$O$_3$ under the following dynamic application of pressure:

Explosive Compaction

Figure 9:
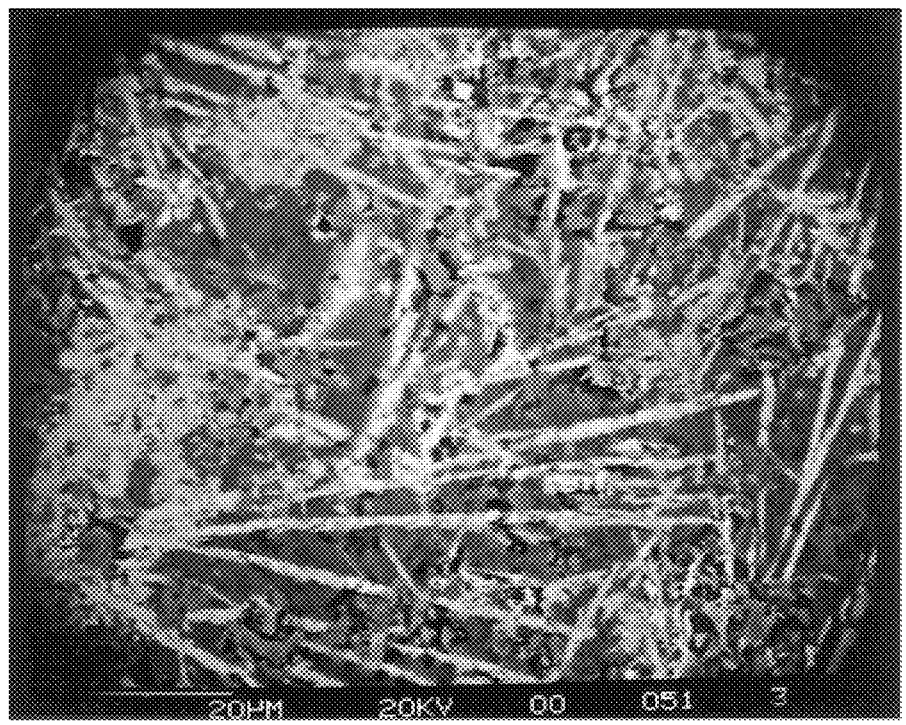
FIG. 9 is a low magnification micrograph view of SHS composite $TiB_2/Al_2O_3$ produced using explosive compaction just after the SHS reaction has occurred.
Figure 13:
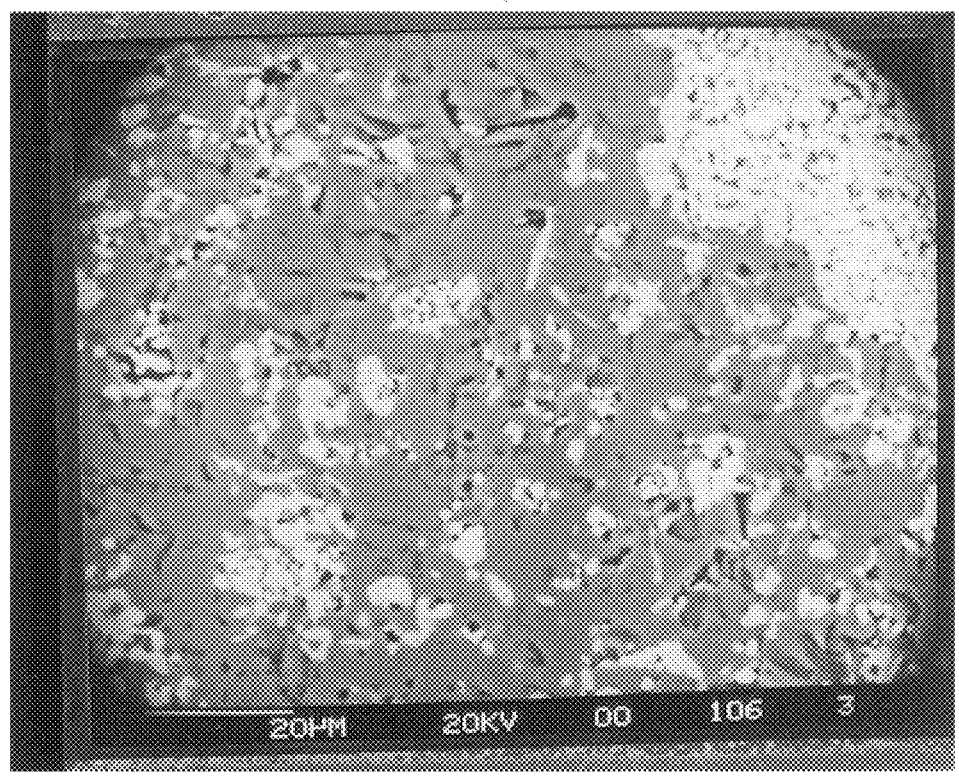
FIG. 13 is a high magnification micrograph view of SHS composite $TiB_2/Al_2O_3$ produced using explosive compaction just after the SHS reaction has occurred.

If explosive compaction is applied about 30–40 seconds following the self-propagating reaction which forms composite TiB$_2$/Al$_2$O$_3$, while the product is still red hot and plastic, the TiB$_2$ grains generally form into a low aspect ration (1/d=~1/1) morphology which become more uniformly distributed in the alumina matrix (FIGS. 9 and 13).

3. If, using self-propagating high-temperature synthesis, the materials are mixed according to equation (1), then allowed to react forming composite TiB$_2$/Al$_2$O$_3$, mechanically milled to reduce the particle size, then hot pressed in an RF induction furnace; or, if, using manual mixing, carbothermic TiB$_2$ and tabular Al$_2$O$_3$ are mixed according to the 3TiB$_2$+5Al$_2$O$_3$ ratio in equation (1), and either manually milled or mechanically milled to reduce the particle size, then hot pressed in an RF induction furnace, then:

A. Continuous Application of Pressure

If a continuous application of approximately 5000 psi is applied to the milled SHS powder, or to the MM powder, TiB$_2$ is generally surrounding the alumina grains (FIGS. 14 and 15).

B. Rapid Application of Pressure

If a minimal application of approximately 500 psi is applied to the milled SHS powder, or to the MM powder, until optimal hot pressing temperature (determined by CTP) is reached, then immediate (within 5 seconds) application of approximately 5000 psi is applied to the materials, the TiB$_2$ is generally uniformly distributed within the alumina (FIGS. 16 and 17).

C. Reduction in Particle Size

Figure 18:
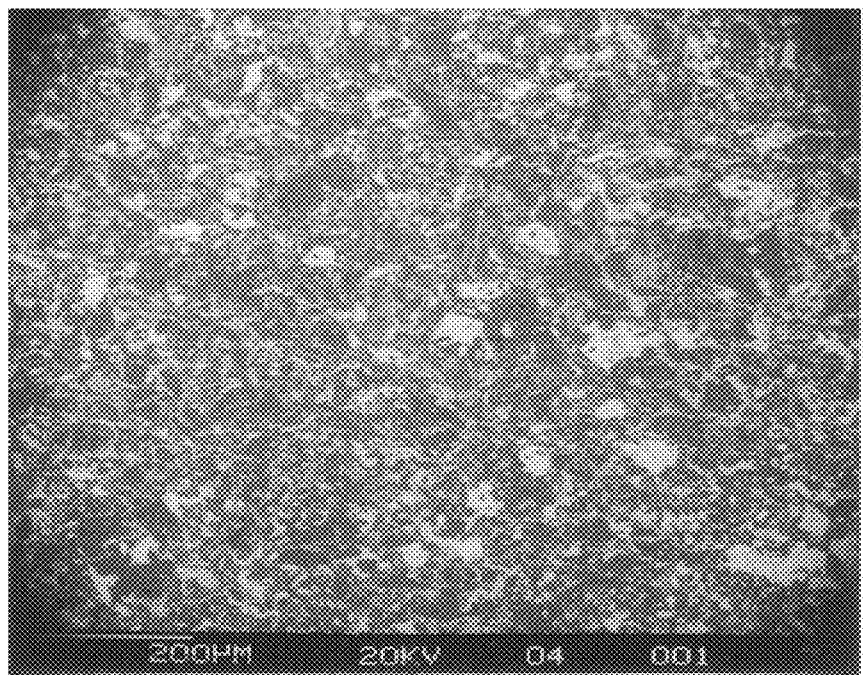
FIG. 18 is a low magnification micrograph view of SHS composite TiB$_2$/Al$_2$O$_3$ ball milled 8 hours and hot pressed at 5000 psi continuous pressure.
Figure 19:
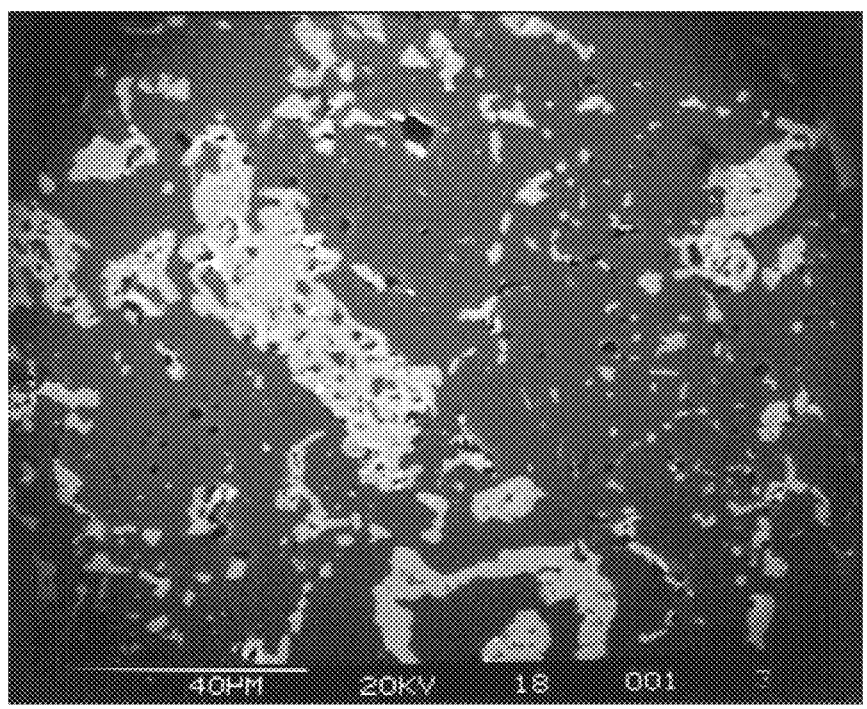
FIG. 19 is a high magnification micrograph view of SHS composite TiB$_2$/Al$_2$O$_3$ ball milled 8 hours and hot pressed at 5000 psi continuous pressure.
Figure 20:
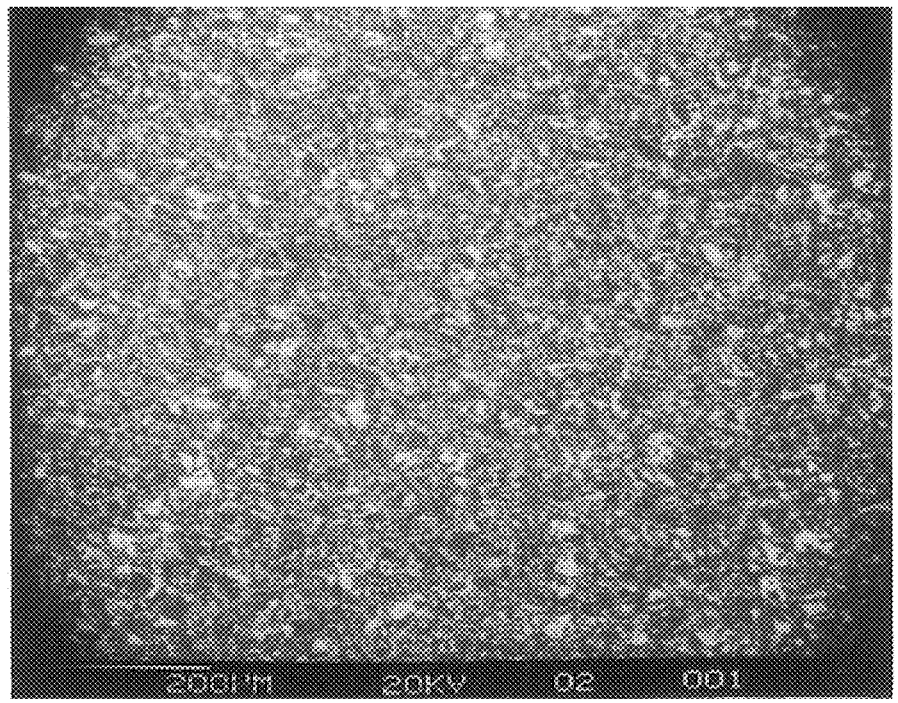
FIG. 20 is a low magnification micrograph view of SHS composite TiB$_2$/Al$_2$O$_3$ ball milled 30 hours and hot pressed at 5000 psi continuous pressure.
Figure 21:
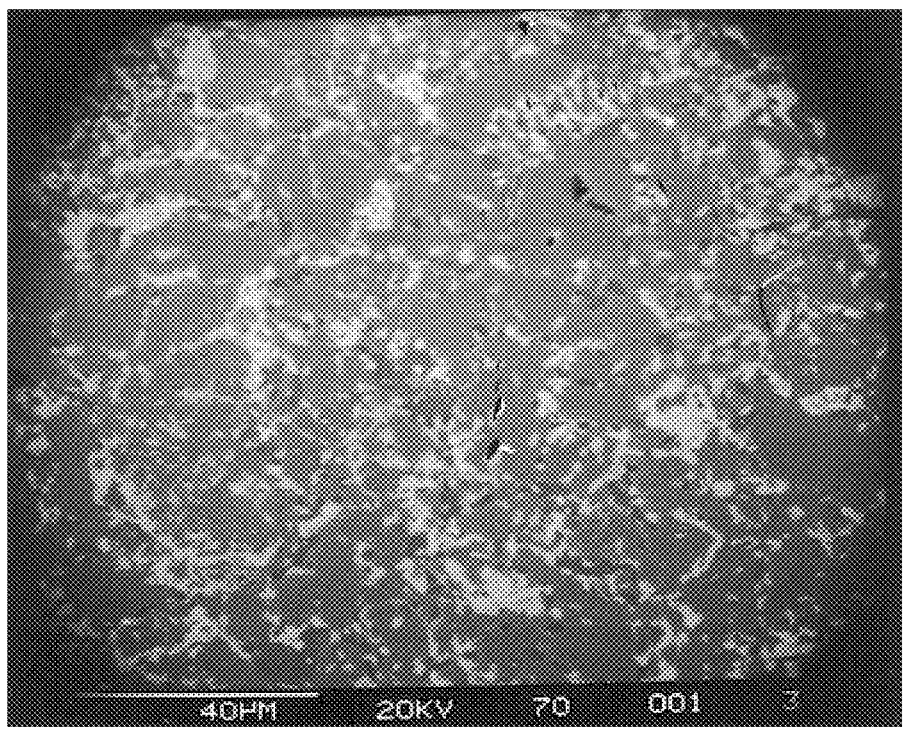
FIG. 21 shows a high magnification micrograph view of SHS composite TiB$_2$/Al$_2$O$_3$ ball milled 30 hours and hot pressed at 5000 psi continuous pressure.

If the SHS TiB$_2$/Al$_2$O$_3$ samples are ball milled 8 hours (FIGS. 18 and 19) the resulting hot pressed grain size is coarser than the grain size of samples which are ball milled 30 hours (FIGS. 20 and 21).

Figure 23:
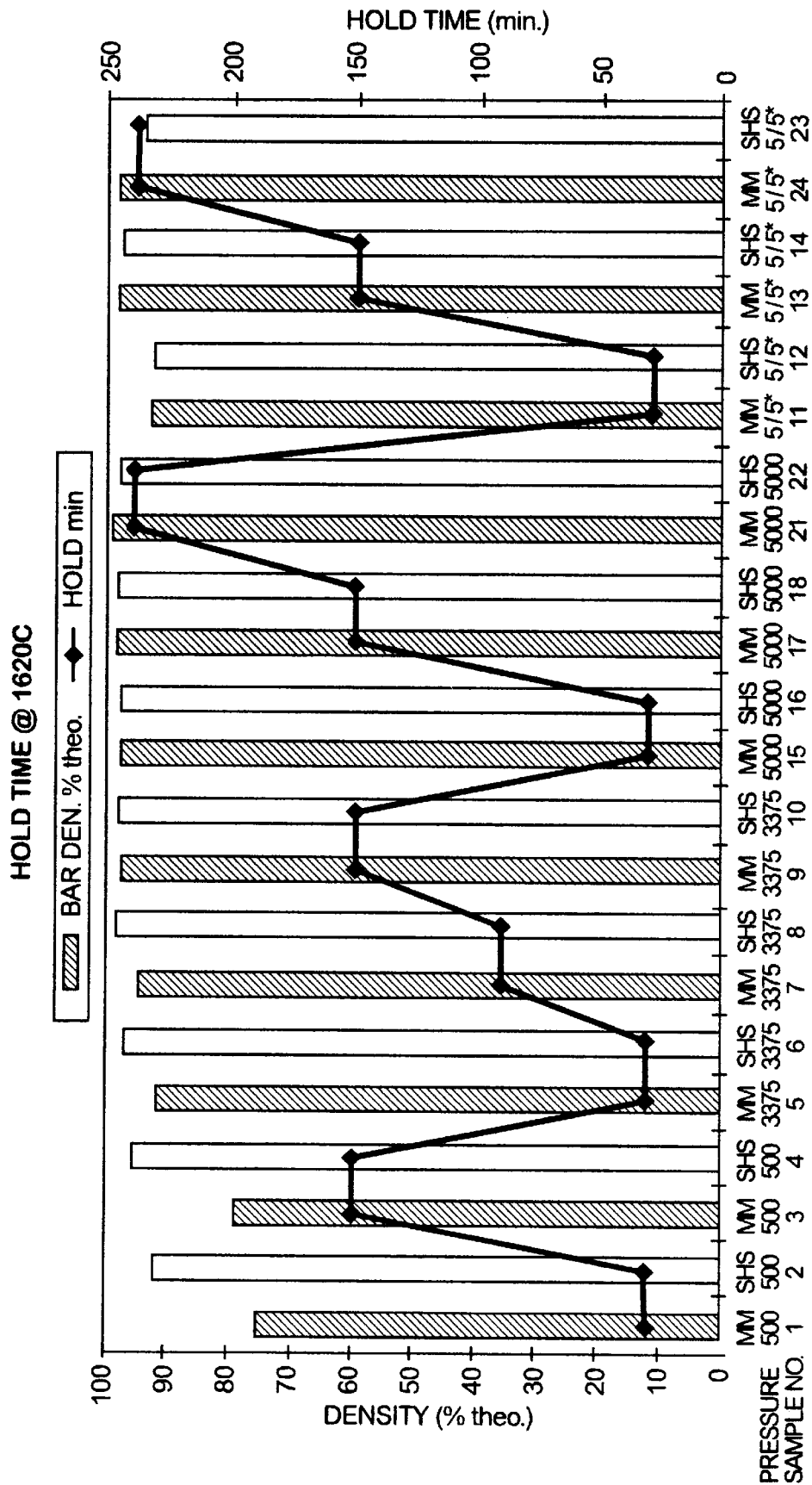
FIG. 23 shows the density results of hot pressing hold times and pressures.
Figure 24:
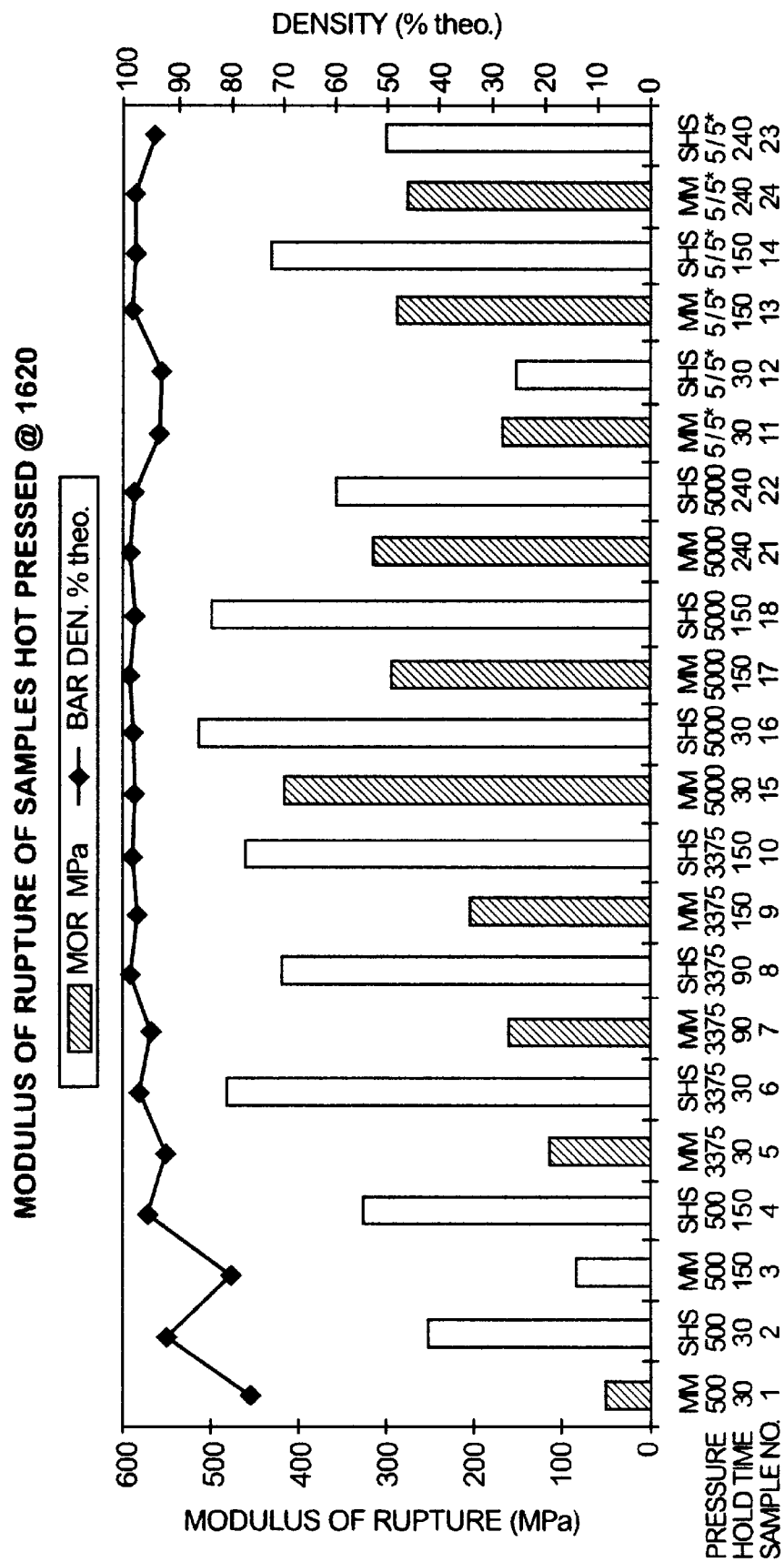
FIG. 24 shows the summary density and MOR results of SHS and MM samples represented in FIG. 23.
Figure 25:
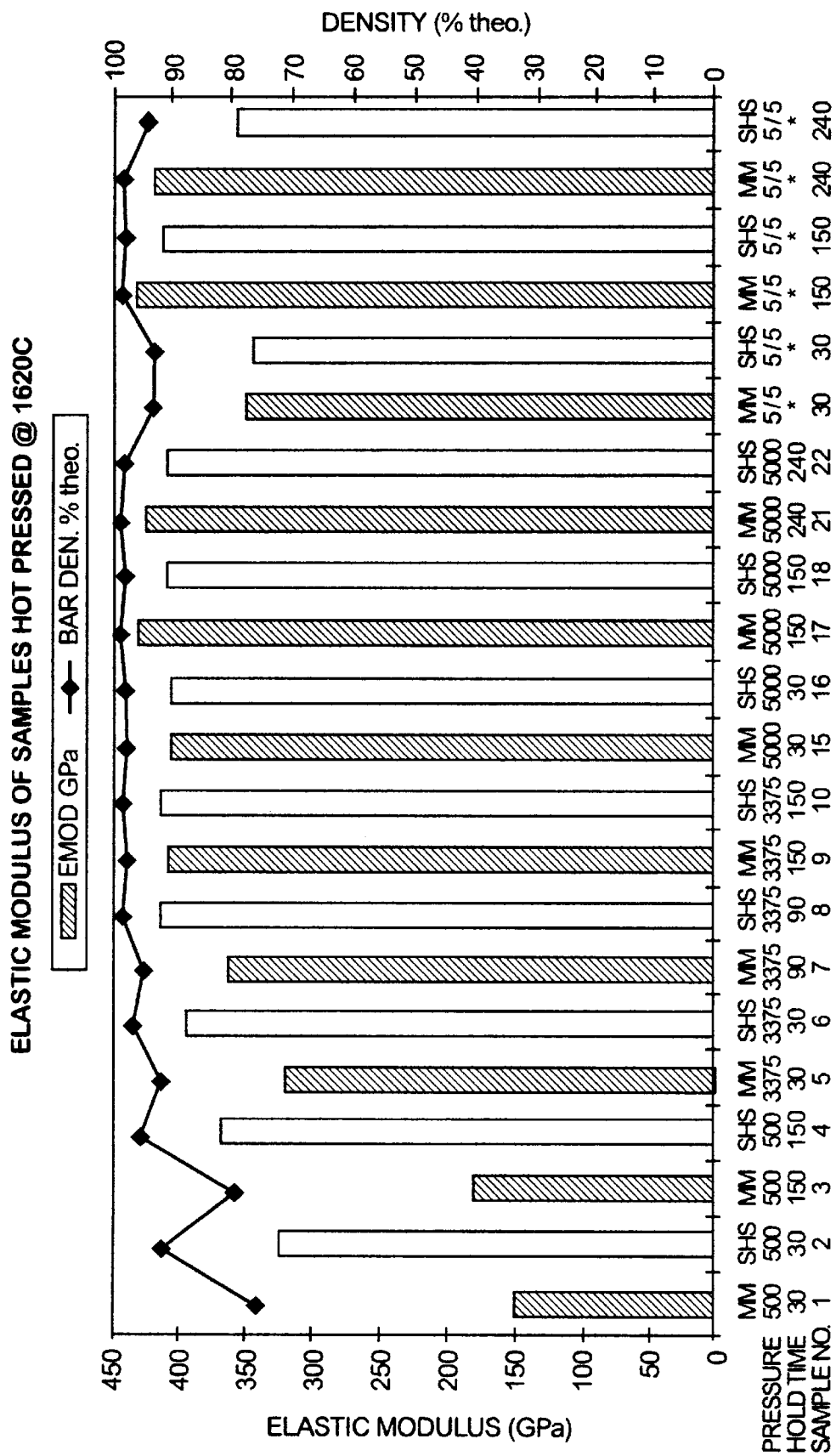
FIG. 25 shows the summary density and EMOD results of SHS and MM samples represented in FIG. 23.

A matrix of the various manufacturing runs is shown in FIG. 22. In FIG. 22, both SHS and MM composites were manufactured using continuous pressures of 500 psi, 3375 psi and 5000 psi for various hold times of 30 min, 90 min, 150 min and 240 min. Also, both SHS and MM composites were manufactured using rapid application of pressure starting at 500 psi and then being increased immediately to 5000 psi when the appropriate temperature was reached, with hold times at 5000 psi of 30 min, 90 min, 150 min and 240 min. FIG. 23 shows the density results of hot pressing hold times and pressures of the manufacturing runs shown in FIG. 22. FIG. 24 shows the summary densities and MOR results of the manufacturing runs shown in FIG. 22. FIG. 25 shows the summary densities and EMOD results of the manufacturing runs shown in FIG. 22.

The average grain size of the SHS shapes is smaller than the average grain size of the MM shapes, with both SHS and MM starting powders having particle sizes of less than approximately 40 microns, and averaging in the 5–12 micron range. As shown in FIG. 25, the modulus of rupture (MOR) and fracture toughness ($K_{ic}$) of the SHS shapes are significantly higher than the MM shapes, while the modulus of elasticity (EMOD) of tie MM shapes is higher than the SHS shapes. As also shown in FIG. 25, the MOR, $K_{ic}$, and EMOD of the SHS TinA shapes are higher than those of the SHS T@A shapes.

As shown and described in this specification, a method has been developed to influence the microstructure of multi-phase composites, allowing one skilled in the art to manufacture predictable composites. Basically, the rapid application of pressure tends to cause one phase to disperse within the other phase, and the continuous application of pressure tends to cause one phase to migrate around the grain boundaries of the other phase. By choosing the appropriate forming parameters, particles of one phase can be biased in both MM and SHS samples either to migrate to the grain boundaries of the other phase, or to disperse within the other phase. With regard to the specific TiB$_2$/Al$_2$O$_3$ embodiment, T@A composite material exhibits characteristics which compare favorably with pure high performance ceramics, with SHS T@A and MM T@A composite materials having superior performance characteristics.

Although the invention has been described in its preferred embodiment, this specification is not meant to limit the spirit and scope of the invention and its equivalents, as defined by the claims.

What is provisionally claimed is:

1. A process for controlling the microstructural bias of multi-phase composite having an aspect ratio by causing a first phase to be uniformly dispersed in a second phase, comprising the steps of:

a. providing a material mixture with an average particle size of less than 40 microns;

b. hot pressing the mixture in a hot press at approximately 500 psi in a reducing environment to an optimal climbing temperature profile temperature; and c. increasing the pressure in the hot press to approximately 5000 psi when the optimal climbing temperature profile temperature is reached, whereby a multi-phase composite is manufactured.

2. The process as claimed in claim 1, wherein two materials are used in the mixture and the two materials are present in the mixture in a ratio range allowing one or more of the materials to become a phase which is continuous in the multi-phase composite.

3. The process as claimed in claim 1, wherein the rate at which the pressure is increased in step (c) controls the aspect ratio of the multi-phase composite.

4. The process as claimed in claim 1, wherein at least one of said materials is a ceramic.

5. The process as claimed in claim 4, wherein said first phase is titanium diboride and said second phase is alumina.

6. The process as claimed in claim 1, wherein said mixture is mechanically milled to an average particle size of less than 40 microns.

* * * * *

UNITED STATES PATENT AND TRADEMARK OFFICE
CERTIFICATE OF CORRECTION

PATENT NO. : 6,090 321
DATED : July 18, 2000
INVENTOR(S) : Kathryn V. Logan

It is certified that error appears in the above-identified patent and that said Letters Patent is hereby corrected as shown below:

Column 1,
Line 7, should include the statement: -- This invention was made with Government support under U.S. Army contract no. DAAE07-95-C-R040. The Government has certain rights in the invention. --

Signed and Sealed this

Twenty-third Day of July, 2002

Attest:

Attesting Officer

JAMES E. ROGAN
Director of the United States Patent and Trademark Office